US012441602B2

(12) United States Patent
Goodwin

(10) Patent No.: US 12,441,602 B2
(45) Date of Patent: Oct. 14, 2025

(54) CLIP ASSEMBLY FOR A FUEL NOZZLE

(71) Applicant: Kharis Leroy Goodwin, Bridgeport, CT (US)

(72) Inventor: Kharis Leroy Goodwin, Bridgeport, CT (US)

( * ) Notice: Subject to any disclaimer, the term of this patent is extended or adjusted under 35 U.S.C. 154(b) by 164 days.

(21) Appl. No.: 18/512,888

(22) Filed: Nov. 17, 2023

(65) Prior Publication Data

US 2024/0092626 A1 Mar. 21, 2024

Related U.S. Application Data

(60) Provisional application No. 63/376,168, filed on Sep. 19, 2022.

(51) Int. Cl.
*B67D 7/50* (2010.01)

(52) U.S. Cl.
CPC ...................................... *B67D 7/50* (2013.01)

(58) Field of Classification Search
CPC ... B67D 7/50; B67D 7/52; B67D 7/06; B67D 7/42
USPC ...... 222/1; 24/545, 546, 456, 457, 485, 499, 24/570, 571; 141/206, 392; 251/89, 90, 251/93, 111, 113, 114
See application file for complete search history.

(56) References Cited

U.S. PATENT DOCUMENTS

| | | | | |
|---|---|---|---|---|
| 4,095,629 | A | | 6/1978 | Jordan |
| 4,176,695 | A | | 12/1979 | Raske |
| 4,275,776 | A | | 6/1981 | Rehkopf |
| 4,334,560 | A | | 6/1982 | Lockwood |
| 4,337,917 | A | * | 7/1982 | Tesack ..................... G05G 5/06 251/114 |
| 4,683,923 | A | | 8/1987 | Harris |
| 4,690,182 | A | | 9/1987 | Knaus |
| 4,846,447 | A | | 7/1989 | Hanna |
| 5,118,074 | A | | 6/1992 | Weissman |
| 5,179,768 | A | * | 1/1993 | Jio .......................... D06F 55/00 24/543 |
| 5,217,054 | A | * | 6/1993 | Mollica .................... B67D 7/50 141/391 |
| 5,752,554 | A | | 5/1998 | Campbell |
| 6,279,621 | B1 | | 8/2001 | Gelsomino |
| 6,830,086 | B2 | | 12/2004 | Smith et al. |
| 7,909,304 | B1 | | 3/2011 | Lombardo |
| 8,905,093 | B2 | * | 12/2014 | Cloud ...................... B67D 7/50 141/390 |
| 9,212,043 | B2 | | 12/2015 | Sefjack |
| 2002/0185622 | A1 | | 12/2002 | Bruns |
| 2006/0185765 | A1 | | 8/2006 | Bates, III |
| 2015/0306755 | A1 | | 10/2015 | Hinds |

* cited by examiner

*Primary Examiner* — David J Walczak
(74) *Attorney, Agent, or Firm* — Dunlap Bennett & Ludwig, PLLC

(57) ABSTRACT

A device separable from a gasoline pump, wherein the device is configured to engage the trigger mechanism of the gasoline pump's fuel nozzle to hold the fuel nozzle in the activated position, thereby enabling hands-free pumping from the fuel nozzle. The device has a set of jaws biased in a closed position yet movable to an open position through manipulation of its lever arms. Teeth provided with the set of jaws facilitate the maintaining of the fuel nozzle in the activated position.

4 Claims, 4 Drawing Sheets

CLIP ASSEMBLY FOR A FUEL NOZZLE

CROSS-REFERENCE TO RELATED APPLICATION

This application claims the benefit of priority of U.S. provisional application No. 63/376,168, filed 19 Sep. 2022, the contents of which are herein incorporated by reference.

BACKGROUND OF THE INVENTION

The present invention relates to fuel nozzles and, more particularly, a device configured to keep the fuel nozzle in the activated position for hands-free pumping of fuel.

A gasoline pump or fuel dispenser is a machine at a filling station that is used to pump gasoline (petrol), diesel, or other types of liquid fuel into vehicles. Fuel nozzles are attached to the pump with flexible hoses, so they can reach the vehicle's filler inlet. Fuel nozzles commonly offer a handle trigger to activate the pumping of the fuel. The fuel nozzle also enables hands-free pumping via a locking mechanism (that pivotably extends from the handle trigger) that holds the handle trigger in the activated position (by selectively wedging in a groove of a series grooves) until it is sensed that the tank is sufficiently full, whereby a sensing mechanism automatically moves the trigger to a deactivated position. Which is convenient in cold weather, when the user of the fuel nozzle wants to use their hands for something else, like operating their smart phone, or when the user desires to avoid the smell of gasoline or otherwise does not want to be anywhere near the pump when it is in operation.

However, there are times with the locking mechanism is not provided or may be broken, forcing the driver to use their hands, and thereby requiring them to stand in the cold, unable to use both hands for something else, and/or endure the smell of gasoline.

As can be seen, there is a need for a device configured to keep the fuel nozzle in the activated position for hands-free pumping of fuel, wherein the device is separable from the gasoline pump.

SUMMARY OF THE INVENTION

The present invention, colloquially known as the "gas bracelet", engages the fuel nozzle trigger mechanism in the activated position, allowing the user to pump gas hands-free.

In one aspect of the present invention, a device for maintaining a fuel nozzle in an activated position includes a clamp assembly having a first jaw portion and an opposing second jaw portion pivotably associated to each other by way of a pivot point so that the jaw portions move between an open position and a closed position, wherein said jaw portions are biased in the closed position so as to maintain a trigger mechanism of the fuel nozzle in the activated position.

In another aspect of the present invention, the above-mentioned device further includes at least one of the following: wherein the trigger mechanism of the fuel nozzle is urged against a handle of the fuel nozzle; wherein the pivot point is a spring-loaded hinge, wherein the pivot point is an arced crossbar, wherein the first jaw portion provides a plurality of teeth along both longitudinal edges thereof, wherein along each longitudinal edge, a length of each tooth is a function of its proximity to a midline of the first jaw portion, wherein the jaw portions each provide a plurality of teeth pairs in a spaced apart arrangement.

In yet another aspect of the present invention, a method of maintaining a fuel nozzle in an activated position, the method includes clamping a trigger mechanism of the fuel nozzle toward a handle of the fuel nozzle so that the fuel nozzle is in the activated position for a desired period, by way of the above-mentioned device.

In another aspect of the present invention, a device for maintaining a fuel nozzle in an activated position includes: a clamp assembly having a first jaw portion and an opposing second jaw portion pivotably associated to each other by way of a pivot point so that the jaw portions move between an open position and a closed position, wherein said jaw portions are biased in the closed position so as to maintain a trigger mechanism of the fuel nozzle in the activated position, wherein the trigger mechanism of the fuel nozzle is urged toward a handle of the fuel nozzle by way of teeth in the closed position, wherein the pivot point is an arced crossbar, wherein the jaw portions each provide a plurality of teeth pairs in a spaced apart arrangement, whereby a method of maintaining a fuel nozzle in an activated position is enabled by clamping a trigger mechanism of the fuel nozzle so that the trigger mechanism is in the activated position for a desired period, by way of the above-mentioned device, wherein two interfacing teeth of the clamp assembly prevent the trigger mechanism from moving away from the activated position, and wherein the arced crossbar engages a rear portion of the fuel nozzle.

In another aspect of the present invention, the device for maintaining a fuel nozzle in an activated position includes the following: a clip assembly having a first jaw portion and an opposing second jaw portion pivotably associated to each other by way of a pivot point so that the jaw portions move between an open position and a closed position, wherein the first jaw portion provides a plurality of spaced apart teeth that mimic grooves for a locking mechanism of the fuel nozzle to engage when the clip assembly is in the open position, whereby a method of maintaining a fuel nozzle in an activated position is enabled by nesting the above-mentioned clip assembly within a trigger guard of the fuel nozzle so that the plurality of teeth are facing upward from a lower portion of the trigger guard; and engaging the locking mechanism between two adjacent teeth of the plurality of teeth.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a device separable from a gasoline pump, wherein the device is configured to engage the trigger mechanism of the gasoline pump's fuel nozzle to hold the fuel nozzle in the activated position, thereby enabling hands-free pumping from the fuel nozzle. The device has a set of jaws biased in a closed position yet movable to an open position through manipulation of its lever arms. Teeth provided with the set of jaws facilitate the maintaining of the fuel nozzle in the activated position.

Figure 1:
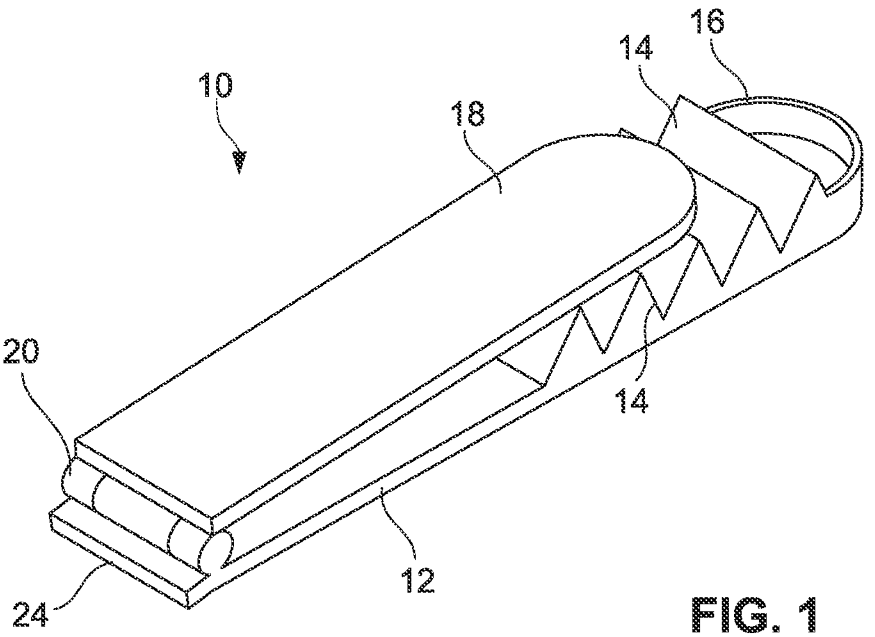
FIG. 1 is a perspective view of an exemplary embodiment of the present invention.
Figure 2:
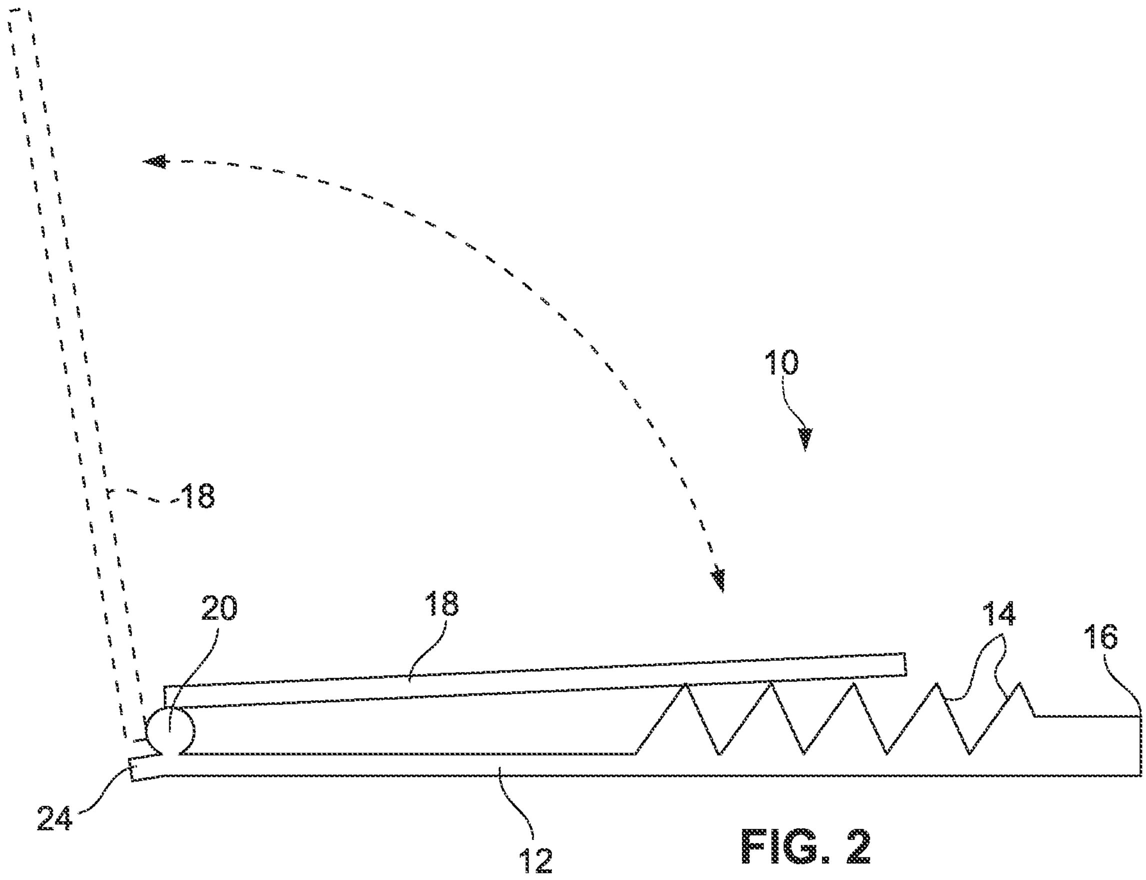
FIG. 2 is an elevation view of an exemplary embodiment of the present invention, showing the movement of opening its jaws.
Figure 3:
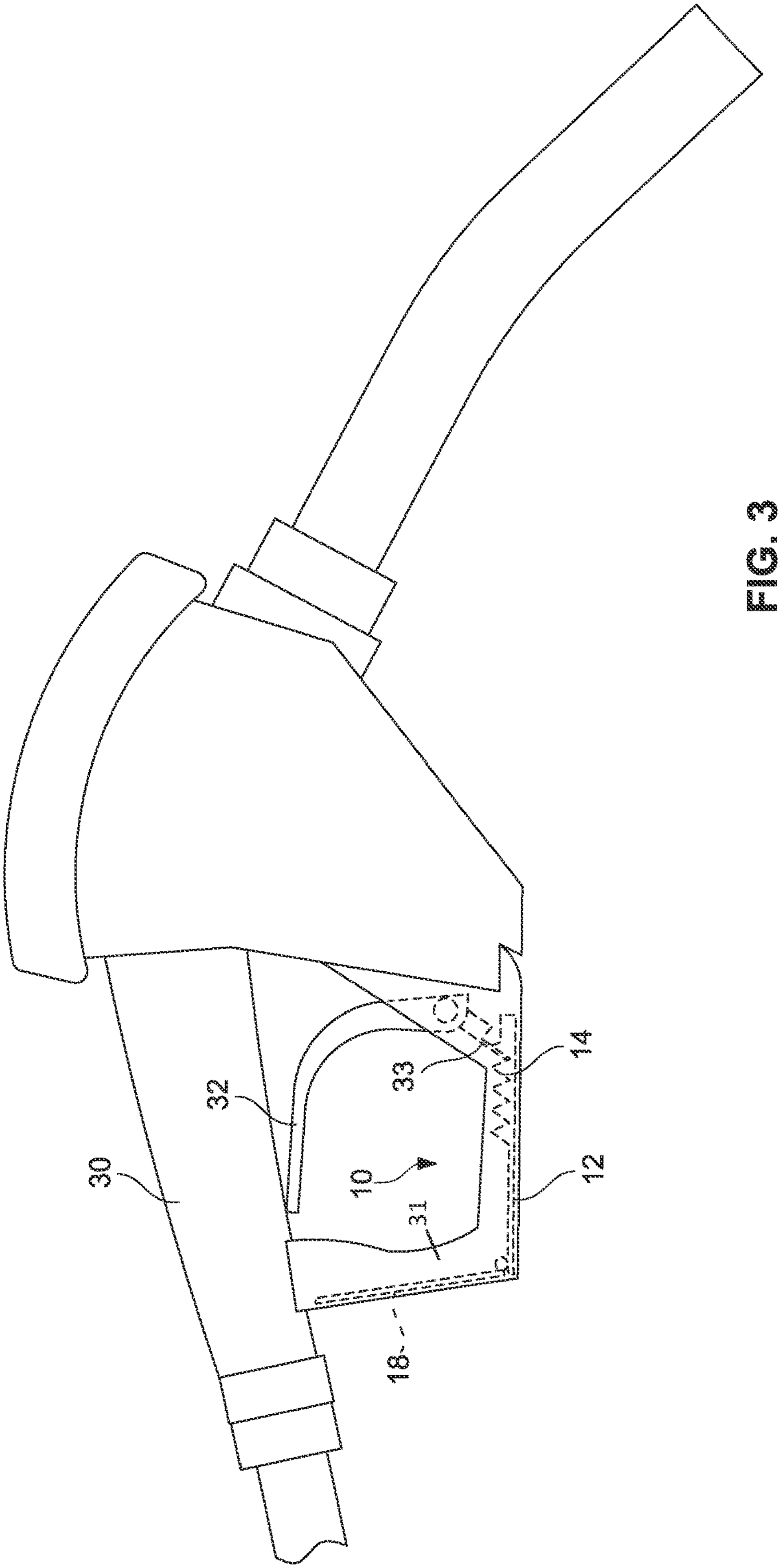
FIG. 3 is a perspective view of an exemplary embodiment of the present invention, shown in use.

Referring now to FIGS. 1 through 3, the present invention may include a clip assembly 10. The clip assembly 10 may have a first jaw portion 12 and an opposing second jaw portion 18 pivotably associated to each other by way of a pivot point 20 in a scissor-like configuration, whereby the two jaw portions 12 and 18 move between an open position and a closed position, as illustrated in FIG. 2. The clip assembly 10 may or may not be biased in the closed position. The pivot point 20 may be a spring-loaded hinge or swinging bar.

The first jaw portion 12 may have a series of teeth 14 that depend from both longitudinal edges thereof. The teeth 14 extend in the direction of the second jaw portion 18 in the closed position. The proximal end of the first jaw portion 12 has a grip element 16 that extends beyond the distal end of the second jaw portion 18 in the closed position. The grip element 16 may provide an arcuate edge from which a flange element projects so as to define a semicircular cavity.

In the open position, the second jaw portion 18 may pivot/rotate more that ninety degrees about the pivot point 20.

In use, referring to FIG. 3, the clip assembly 10, in the open position, tucks within the cavity of a trigger guard 31 of a fuel nozzle that has its series of wedges removed or damaged, whereby the teeth 14 of the clip assembly enables the locking mechanism 33 to find purchase between two adjacent teeth 14 so as to hold the handle trigger 32 in the activated position.

Figure 4:
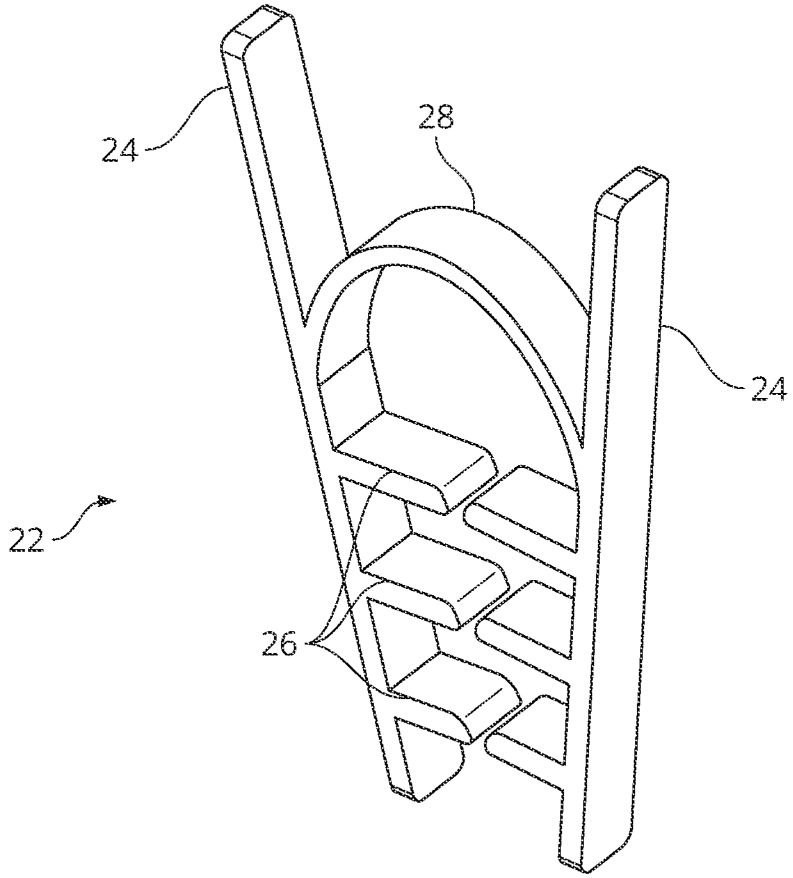
FIG. 4 is a perspective view of an exemplary embodiment of the present invention.
Figure 5:
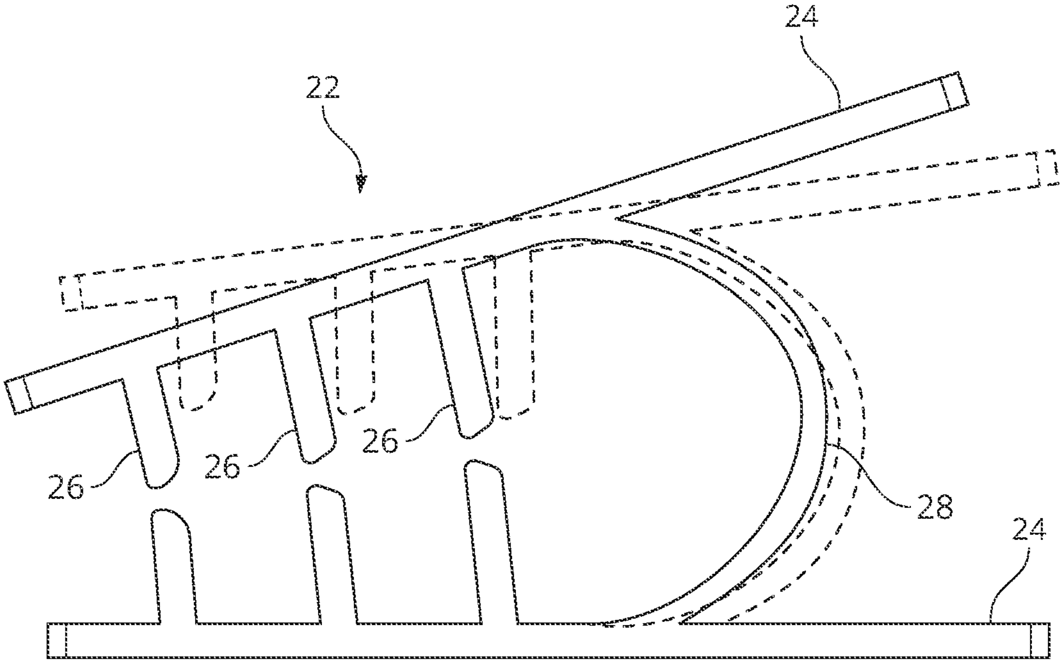
FIG. 5 is an elevation view of an exemplary embodiment of the present invention, illustrating the opening of its jaws.
Figure 6:
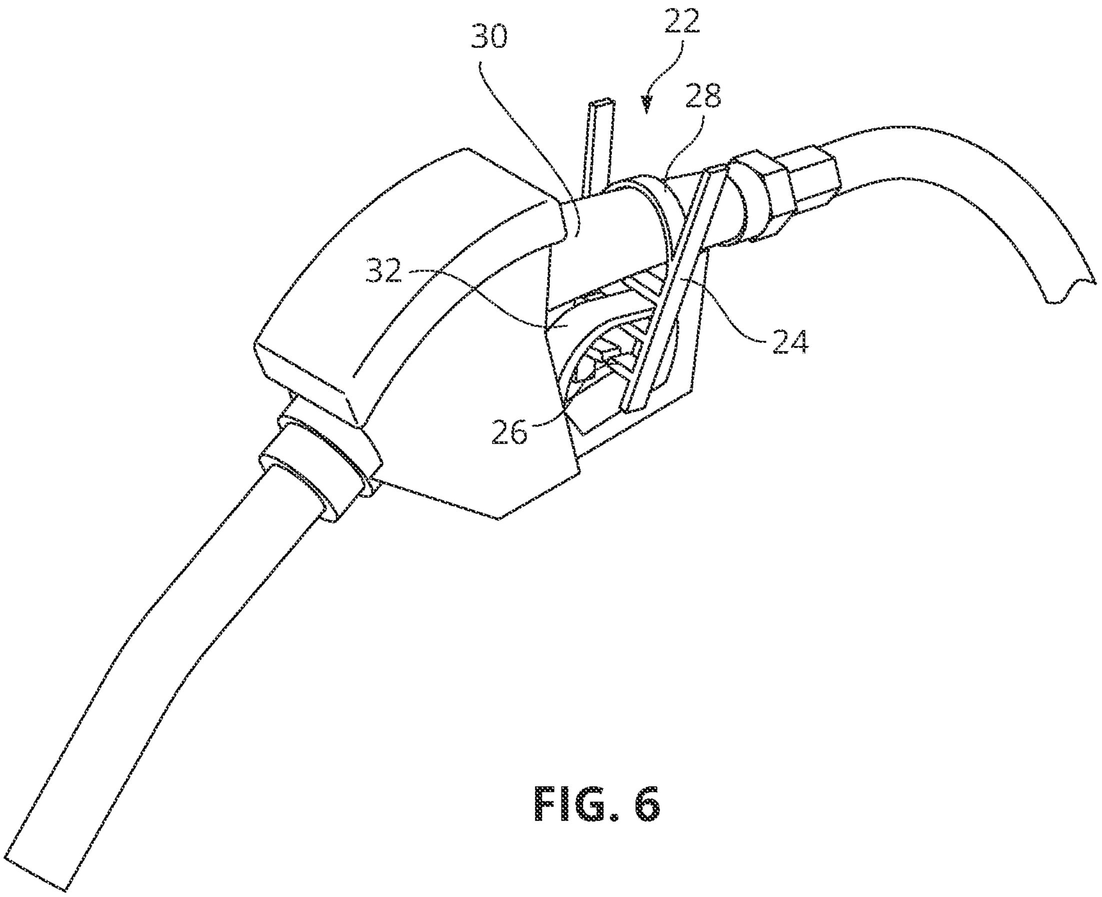
FIG. 6 is a perspective view of an exemplary embodiment of the present invention, shown in use.

Referring now to FIGS. 4 through 6, the present invention may include a clamp assembly 22 wherein the pivot point 28 is an arced crossbar, and wherein the teeth 26 of the clip assembly 22 extend from both the first and second jaw portions 24 so as to provide a configuration where the occlusal portions of opposing teeth 26 interface and slightly spaced apart in the closed position. The teeth 26 of this second embodiment do not extend from a longitudinal edge, but rather a longitudinal axis of the cross section of each tooth 26 is orthogonal the longitudinal edges of the relevant jaw portion.

Regarding use of the clamp assembly 22, referring to FIG. 6, the trigger mechanism 32 of the fuel nozzle 30 may be clamped or retained in the activated position when the clamp assembly 22 holds the trigger 32 in the activated position by way of two teeth 26. The arcuate pivot point 28 may engaged a rear portion of the fuel nozzle 30 after the clamp assembly 22 is moved to the open position to fit around the handle portion of the nozzle 30 so as to engage and retain the trigger mechanism 32.

Alternatively, clamp assembly 22 provides sufficient bias (by way of the spring-loaded hinge or arced crossbar) in the closed position that the trigger mechanism 32 of a nozzle 30 is urged to maintain an activated position (e.g. opening the valve that allows fuel to flow from the nozzle 30) without further manipulation by a user, that the nozzle 30 is thereby operating "hands-fee" when either the grip element 16 or teeth 14 and the second jaw portion 18 are urging the trigger mechanism 32 (against the handled of the nozzle 30) in the activated position or when the force provided between the occlusal portions of two opposing teeth 26 are clamping the trigger mechanism 32 in the activated position.

Referring now to the Figures of the provisional patent application, which is incorporated herein by reference, the present invention may include a clip assembly. The clip assembly may have a first jaw portion and an opposing second jaw portion pivotably associated to each other by way of a pivot point in a scissor-like configuration, whereby the two jaw portions and move between an open position and a closed position wherein the two jaw portions engage each other or an object in between. The clip assembly is biased in the closed position.

The bias of the closed position can be overcome by urging a clip arm of the clip assembly in a first direction, since the clip arm is operatively associated with the pivot point though on an opposing side thereof relative to the first jaw portion. Thus, like a lever about the pivot point fulcrum, urging the clip arm in the first direction results in the first jaw portion moving away from the second jaw portion. The pivot point may be a spring-loaded hinge or swinging bar.

The first jaw portion may have a series of teeth that depend from both longitudinal edges thereof. The teeth may extend in the direction of the second jaw portion, though the teeth end prior to touching the second jaw portion in some embodiments. In one embodiment, the length of the tooth depends on its location along the first jaw portion, wherein the distal teeth extend a fraction of the length of the mesial teeth. The proximal end of the first jaw portion has a grip element having a length greater than any of the teeth, and so a distal end of the grip element engages the second jaw portion in the closed position.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of maintaining a fuel nozzle in an activated position, the method comprising:

clamping a trigger mechanism of the fuel nozzle so that said trigger mechanism is in the activated position for a desired period, by way of a device comprising:

a clamp assembly having a first jaw portion and an opposing second jaw portion pivotably associated to each other by way of a arced crossbar so that the jaw portions move between an open position and a closed position, wherein said jaw portions are biased in the closed position for maintaining said trigger mechanism in the activated position and urged toward a handle of the fuel nozzle by way of teeth in the closed position, wherein the jaw portions provide a plurality of teeth pairs in a spaced apart arrangement.

2. The method of claim 1, wherein two interfacing teeth of the clamp assembly prevent the trigger mechanism from moving away from the activated position.

3. The method of claim 2, wherein the arced crossbar engages a rear portion of the fuel nozzle.

4. A method of maintaining a fuel nozzle in an activated position, the method comprising:

providing a clip assembly having a first jaw portion and an opposing second jaw portion pivotably associated to each other by way of a pivot point so that the jaw portions move between an open position and a closed position, wherein the first jaw portion provides a plurality of spaced apart teeth that mimic grooves for a locking mechanism of the fuel nozzle to engage when the clip assembly is in the open position;

nesting the clip assembly within a trigger guard of the fuel nozzle so that the plurality of teeth is facing upward from a lower portion of the trigger guard; and engaging the locking mechanism between two adjacent teeth of the plurality of teeth.

* * * * *